United States Patent [19]
Cali et al.

[11] Patent Number: 5,281,025
[45] Date of Patent: Jan. 25, 1994

[54] TEMPERATURE SENSING DEVICE FOR DYNAMICALLY MEASURING TEMPERATURE FLUCTUATION IN A TIP OF A BONDING DEVICE

[75] Inventors: Matthew F. Cali, Harriman; Pedro A. Chalco, Yorktown Heights, both of N.Y.

[73] Assignee: International Business Machines Corp., Armonk, N.Y.

[21] Appl. No.: 4,365

[22] Filed: Jan. 14, 1993

[51] Int. Cl.⁵ .................. G01K 1/14; G01K 7/04
[52] U.S. Cl. .................. 374/141; 324/73.1; 324/511; 374/179
[58] Field of Search ........... 374/179, 113, 112, 141; 136/230, 225, 211; 228/103; 174/263; 219/121.83, 85.22; 324/73.1

[56] References Cited

U.S. PATENT DOCUMENTS

| | | | |
|---|---|---|---|
| 3,540,280 | 11/1970 | Schoenlaub | 374/113 |
| 3,688,295 | 8/1972 | Tsoras et al. | 374/170 X |
| 3,891,822 | 6/1975 | Laub et al. | |
| 4,242,907 | 1/1981 | Kazmierowiez | 374/113 |
| 4,861,169 | 8/1989 | Yoshimura | |
| 4,878,016 | 10/1989 | Wahl et al. | |
| 5,001,423 | 3/1991 | Abrami et al. | |
| 5,011,543 | 4/1991 | Yokoi | |
| 5,033,866 | 7/1991 | Kehl et al. | |
| 5,079,070 | 1/1992 | Chalco et al. | 428/426 |
| 5,180,440 | 1/1993 | Siegel | 228/103 X |
| 5,196,672 | 3/1993 | Matsuyama et al. | 219/121.83 |

OTHER PUBLICATIONS

R. T. Hodgson and K. Seshan, *Thermocouple Laser Bonder Tip*, IBM Technical Disclosure Bulletin, vol. 33, No. 5, Oct. 1990.

*Primary Examiner*—Daniel M. Yasich
*Attorney, Agent, or Firm*—Sterne, Kessler, Goldstein & Fox

[57] ABSTRACT

A temperature sensing device for accurately measuring the temperature of a microbonding device tip. The temperature sensing device consists of an array of thin-film thermocouples produced by thin-film patterning techniques on a substrate card. Each thermocouple is composed of two circuit lines of dissimilar metals A & B. The dissimilar metals are superimposed at a junction point. A third metal C is deposited between the metals A and B to prevent premature degradation of the thermocouple junction. A common line is used for one of the two metals connecting to the junctions. This allows almost twice as many thermocouples than conventional layout techniques.

27 Claims, 12 Drawing Sheets

TEMPERATURE SENSING DEVICE FOR DYNAMICALLY MEASURING TEMPERATURE FLUCTUATION IN A TIP OF A BONDING DEVICE

TECHNICAL FIELD

The present invention relates generally to an apparatus and method for dynamically measuring temperature in a tip of a bonding device. More particularly, the present invention relates to a system, a device and a method to accurately and reliably diagnose the bonding capability of a tip used in microbonding applications in microelectronics.

BACKGROUND ART

Microelectronic environments generally employ micro-bonding techniques to "hand-craft" circuitry that conduct electricity to perform an intended function. Electronic products (such as computers) are constantly shifting toward higher density packaging of electronics hardware in order to achieve higher performance, while reducing the product size. This has led to high-density circuitry, micro-wiring and Very-Large-Scale-Integration all of which require line dimensions significantly below 100 microns (100 microns is of the order of the size of a human hair). Because of the small circuitry dimensions and the high performance materials used, high density circuit modules are normally very expensive production parts.

Micro-bonding is the process of joining very-fine metallic components. In microelectronics microbonding is used to modify existing circuitry. For example, microbonding can be used to repair an "open" (discontinuity) in the existing circuitry, or to connect a device to the existing circuitry to perform the intended function of the overall circuit design (for a more detailed discussion of bonding applications see U.S. Pat. No. 5,079,070 to Chalco, et al., and U.S. Pat. No. 4,970,365 to Chalco, incorporated herein by reference).

One bonding method is called diffusion bonding, where surfaces to be bonded are pressed together and heated until atomic diffusion takes place. Another bonding method involves soldering, where solder alloys are melted while in close contact with the bonding surfaces.

Microbonding is normally performed with a conventional bonding tip provided by commercial bonders. In these type of bonders, the tip is normally energized by a pulse of ultrasonic vibration that generates friction energy that supplies heat needed for bonding. In some circumstances, external heating is supplied to the tip, when friction heating is not sufficient. In this case, it is desirable to confine the external heat to a very small volume of the bonding end of the tip. This achieved by applying heating pulses (e.g., a laser) for very short duration (10-500 milliseconds). See also U.S. Pat. No. 4,970,365 supra.

In order to achieve a highly reliable bond with an energized tip, the key process parameter to control is the tip temperature. Tip temperature is typically measured using conventional temperature sensors such as thermocouple devices.

A thermocouple is a source of electrical potential (e.g., a battery). It is made of two dissimilar alloys referred here as thermocouple metals A and B. Depending on the materials selected for metals A and B, either A or B can be the positive or negative pole of the battery that the thermocouple represents. Metals A and B come in contact with each other at a point called the junction which is the sensing point of the device. When temperature is applied to the junction, a thermo-electric potential difference develops across the two different metal alloys. This potential difference (or voltage) can then be translated into a temperature reading. This is a highly reliable method of measurement if the mass of the thermocouple junction is at least two orders of magnitude smaller than the mass of the heated mass of the tip.

However, in microbonding the heated mass of the bonding tip is of the same order of magnitude as the mass of the junction made with conventional thermocouple wires. In theory very fine thermocouple wires could be used, but the smallest size produced has a diameter equal to 25 microns, which is still significantly larger than the desired size of 5 microns or less. Therefore, inaccurate temperature measurements are incurred as a result of high thermal dissipation associated with conventional thermocouple wires.

Additionally, 25 micron wires are smaller than a human hair and therefore are very fragile to handle during positioning under the tip. This requires a very tedious alignment procedure under a high-power microscope. This is unacceptable in a production environment where reproducible readings are expected without costly production delays.

Therefore, what is needed is a reliable tip temperature device that can be used in a manufacturing environment. Preferably this device should be based on the thermocouple-wire principle but it must yield reliable, accurate and consistent readings over an extended life of several thousand readings per device, and it should allow easy replacement, by the operator after completion of its useful life.

DISCLOSURE OF INVENTION

The present invention relates to an apparatus and a method to accurately and reliably diagnose the temperature status capability of a bonding tip. The present invention is generally used in microbonding applications in microelectronics.

The diagnostic device of the present invention includes a plurality of thin-film thermocouples produced by thin-film patterning methods on a flat substrate card. Each thermocouple is composed of two circuit lines of dissimilar metals (A and B) printed separately and superimposed at a point called a junction. The voltage signal generated at the thermocouple junction is transported by the thermocouple lines to a point near the edge of the card where the lines end on rectangular pads in a standard printed-circuit-board configuration. This allows the card to be easily inserted into an edge connector (an electrical female adapter).

Each thermocouple is meant to be used sequentially to serve its useful life, and then to proceed to the next available thermocouple until all the thermocouples available are used. At this point the used card is replaced with a new card. Considering that the useful life of the device is in direct proportion to the number of thermocouples contained on the thermocouple card, a key feature of the invention is the use of one common line for one of the two metals connecting to the junction. This feature allows almost twice as many thermocouple junctions (in a fixed surface space) than the number possible if two independent lines are used per each thermocouple, as in a conventional design.

Using an edge connector with a top-bottom dual set of contact fingers to establish an electrical connection with the card permits both sides of the card to be used. The top surface of the card is used for printing the plurality of thermocouples. Each thermocouple is contacted individually by each contact finger of the top row of contacts in the edge connector. The bottom surface of the card is used to establish a common contact point for the common line, which as explained earlier allows double the number of thermocouples printed on a given surface space.

Access to the bottom surface from the pad on the top surface where the common metal line ends is provided by a "via hole." The via hole inter-connects both sides of the card. By employing this approach, each thermocouple is connected at the edge connector at two points, thus allowing the use of two independent wires for each thermocouple to carry the signal out of the thermocouple card. Using two independent wires for each thermocouple permits the thermocouple wires to be twisted in a conventional "twisted-pair" configuration. This is imperative to eliminate electrical noise (improve signal to noise ratio).

Another key feature of the invention is the use of a third metal layer deposited between the two thermocouple metals to serve as a diffusion barrier between the metals. This feature enhances the reliability of the device and prevents premature degradation of the thermocouple signal caused by gradual alloying of the thermocouple metals at the junction.

Another factor that leads to improved reliability is the use of thin films having a thickness of the order of 0.1 to 1 microns which reduces the mass of the junction to a level that allows accurate and reliable temperature readings.

Considering that thin films are structurally fragile and prone to accidental damage during handling or use of the device, a protective cover is used which provides access to the junctions only. This cover is attached to the thermocouple device.

The choice of substrate materials to hold the thermocouple array is a porcelain-coated steel composite that is very inexpensive and provides higher resistance to localized melting under the thermocouple junction spot than conventionally used materials.

The system of the present invention includes: a thermocouple card, a fixture that holds the edge connector where the card is inserted, and a computer-based data acquisition to process the thermocouple signal. The fixture holding the card can be either in a fixed position attached to the stage used to position the work piece under the bonding tip, or it can be a mobile fixture set aside and moved manually under the tip.

The method of tip temperature probing according to the present invention includes using a thin-film thermocouple junction as a point probe by touching the junction with the tip. In order to take a temperature reading the thermocouple probe card is positioned under the tip by moving the fixture that holds the card. A thermocouple junction is selected from several available on the card and the tip is positioned directly above this point. This alignment position is performed manually under a high-power microscope or alternatively the positions of the thermocouple junctions can be stored in the memory of a computer controlling the motion of the stage on which the probe station is mounted.

The next step is to bring the tip in contact with the junction (probe), and then energize the tip. The temperature rise at the point of contact will then be traced accurately on a computer display monitor. For the purpose of assisting an operator in the manufacturing floor to diagnose the readiness of the bonding tip, the maximum temperature value can be displayed on the screen. The operator then decides if this is an adequate value. If an adjustment needs to be made, the operator can then make the proper power adjustments to either increase or decrease the peak temperature of the tip. If the tip is energized solely with an ultrasonic pulse, the temperature trace displayed will represent the friction heat generated by the tip and therefore the trace will represent a signature of the efficiency of the ultrasonic vibration. If the efficiency is below a given level the quality of the bond will be poor and the operator must make the necessary power adjustments. Similarly if heat is delivered to the tip from an external source (such as a laser) the temperature trace will reflect the efficiency of the heat delivery and its transfer through the tip.

The foregoing and other features and advantages of the invention will be apparent from the following more particular description of the preferred embodiments of the invention, as illustrated in the accompanying drawings.

BEST MODE FOR CARRYING OUT THE INVENTION

1.0 Overview

The present invention is system, apparatus, and method for measuring the temperature of a bonder tip in a micro-electronic electronic environment. The present invention employs a unique temperature sensing device. Discussion of the temperature sensing device is broken down into three sections: 1) design and structure, 2) operation and 3) fabrication.

2.0 Design and Structure

Throughout this discussion, for purposes of illustration, the terms "junction point" and "thermocouple" will both be referenced by the same number, because the junction point is the working point of a thermocouple and such a labeling technique simplifies the following discussion.

Additionally, terms such as wires, lines, paths, and connecting lines are often interchanged when referring to printed circuitry on a substrate card.

Figure 1:
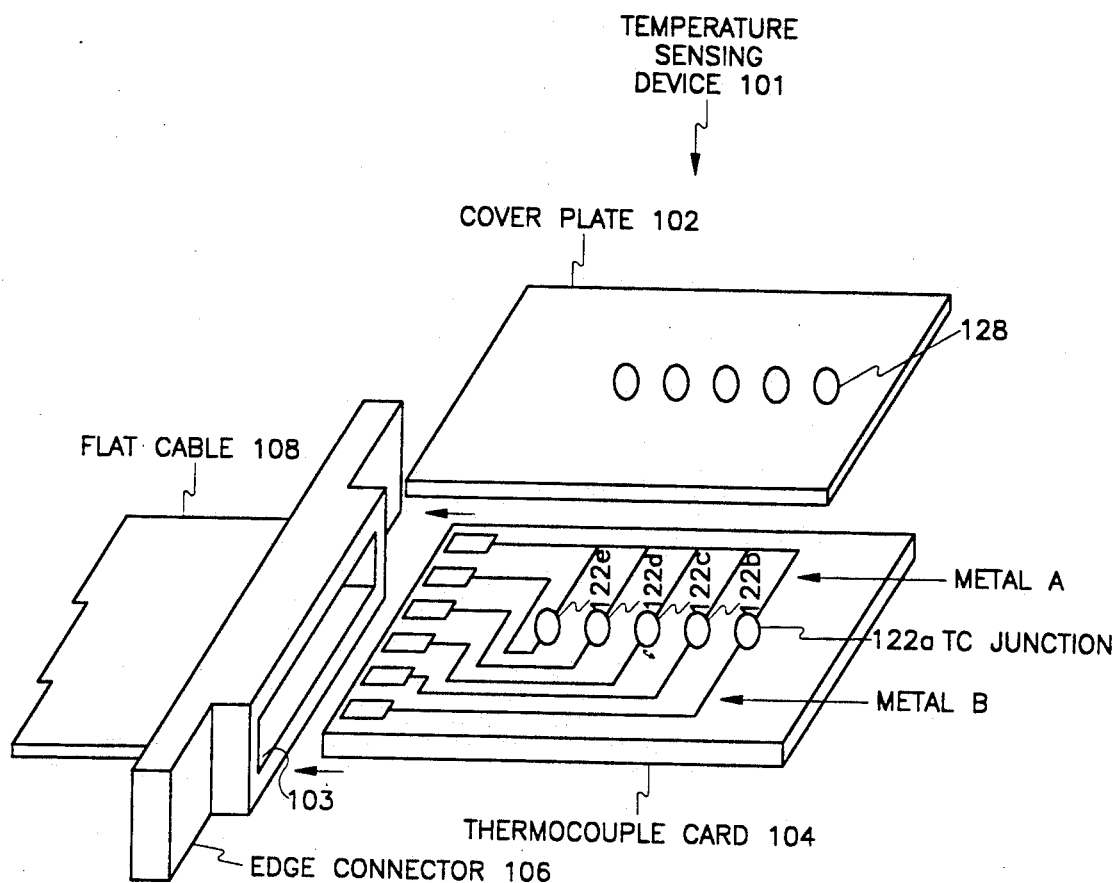
FIG. 1 shows an uncovered view of a temperature sensing device 101 in accordance with a preferred embodiment of the present invention.

FIG. 1 shows an uncovered view of a temperature sensing device 101 in accordance with a preferred embodiment of the present invention. Located in proximity of the temperature sensing device is an edge connector 106 and a cable 108. Temperature sensing device 101 plugs into a female adapter 103 of the edge connector 106. Pins (not shown) inside the female adapter provide electrical contact with the sensing device 101 and allows signal data to flow to cable 108.

Figure 2:
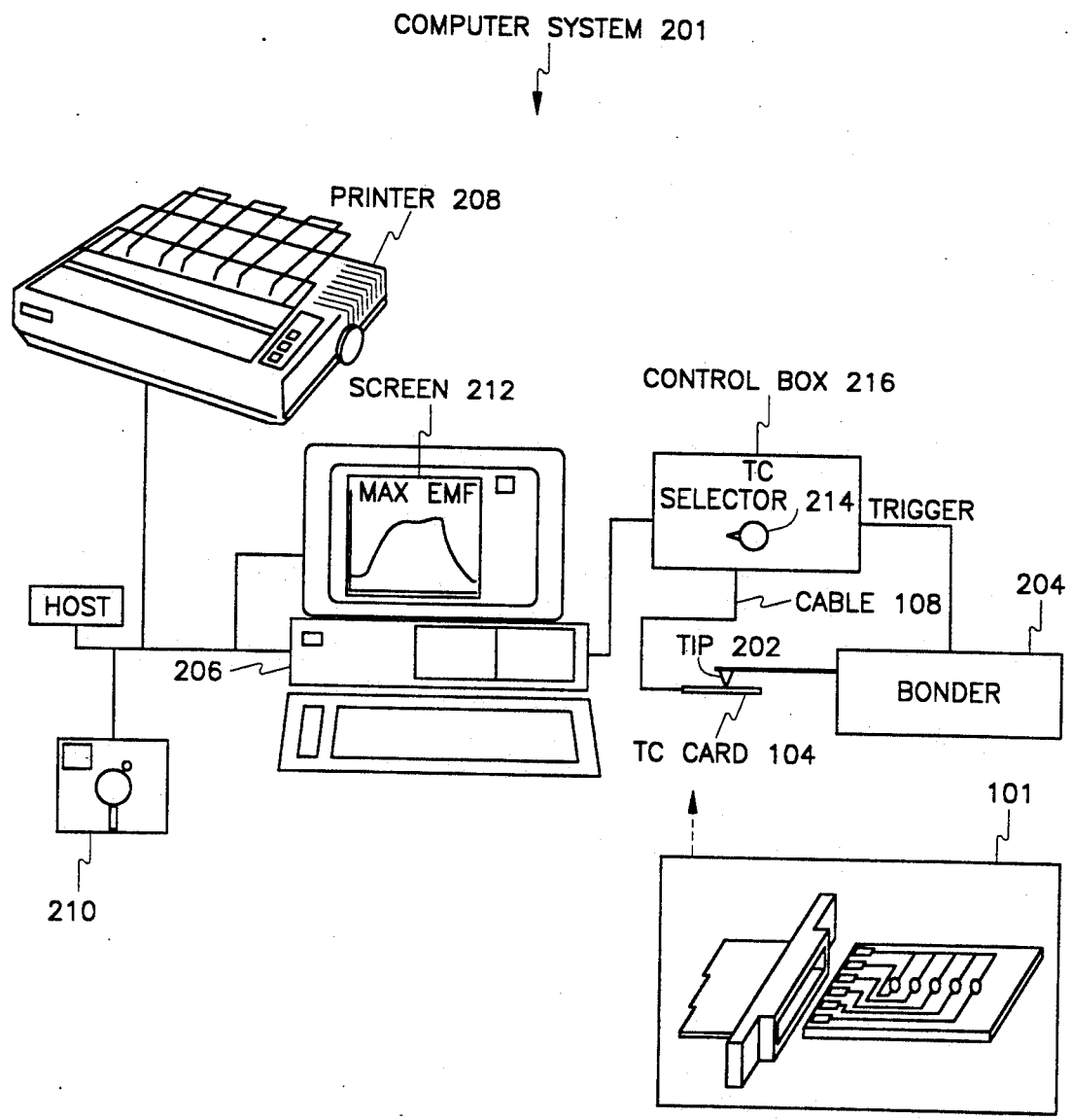
FIG. 2 shows a computer-based data acquisition system 201 for tracing and analyzing fast temperature pulses produced by a tip.

The cable 108 provides a transport mechanism for electrical signals received from the temperature sensing device 101. These signals are transported, via cable 108, to a computer-based data acquisition set-up 201 for tracing and analyzing fast temperature pulses produced by a tip 202, as shown in FIG. 2. Tip 202 include any type of tips that produce heat and should not be limited to bonding tips.

Referring to FIG. 2, in a preferred embodiment, the computer-based data acquisition system (DAS) 201 includes: a computer 206, a printer 208, and software 210. In the right hand corner of FIG. 2 is an exploded view of the temperature sensing device 101 shown in FIG. 1.

The bonding tip 202 is connected to a bonder 204. The bonder 204 is the source of ultrasonic energy for the tip 202. An additional source of heating energy can be provided to the tip 202 by using external sources such a electrical resistance and laser radiation (not shown). A detailed description of an apparatus and method used for microbonding using a mix of ultrasonic and laser energy is described in U.S. Pat. No. 4,970,365 to Chalco, which is incorporated herein by reference.

While a manual operation is described below for obtaining temperature reading and data acquisition, it will be understood by those skilled in the art that a fully automated and fully computerized system can replace the manual operation steps.

Once a thermocouple junction 122 is chosen by an operator, a selector knob 214 of a thermocouple selector box 216 is turned to a position to inform the DAS 201 of an appropriate thermocouple 122. At this point the DAS 201 is in a stand-by mode waiting for the tip to be energized. When this occurs the bonder 204 signals (triggers) the DAS 201 to start a temperature measurement. Temperature data points are read and stored in memory. The maximum temperature reading is then displayed on the screen in terms of maximum Electro-Motive-Force in units of millivolts. This information can be recorded on the printer 208.

A very useful option for a tip operator is to plot a temperature trace. This provides an operator with the ability to examine the temperature trace (rise and drop) for a more detailed certification of the bonding capability of the tip 202, or to trouble-shoot the bonding process when a problem is encountered or suspected. Plots will be described below with reference to FIGS. 11 and 12.

Additionally, the operation of computer system 201 in relation to the present invention will be explained in more detail below in section 3.0.

Referring back to FIG. 1, temperature sensing device 101 includes: a cover plate 102 and a thermocouple (thermocouple) card 104. Thermocouple card 104 is a printed flat substrate carrier (similar to a small printed circuit board) at the thin film level having wires preferably between 0.1 microns and 5 microns thick. Fabrication of wires is not limited to thin film.

The selection of the material used as a substrate for thermocouple card 104 depends on the tip temperature needed for bonding. For applications where the bonding temperature is low (approximately 100°–300° C.) an organic material such as FR-4 epoxy is the best choice because it is readily available and relatively inexpensive. However for higher bonding temperatures the epoxy material deteriorates rapidly by melting under the hot tip.

Conventional ceramic material such as alumina have relatively high heat-conductivity that causes severe heat sinking below thermocouple junction spots. Additionally, ceramic material are relatively expensive, fragile, and prone to cracking under thermal shock. For these reasons the selection of a ceramic material is to be limited to very high tip temperature applications (above 700° C.). However, tip temperatures of this level have limited use since the tip will deteriorate rapidly.

A third category of substrate materials is a porcelain-coated-steel (PCS) composite material. This is the preferred material, because it has a service temperature limit that is within the temperature range dictated by most bonding applications. This range is 100°–700° C. As in the case of epoxy, PCS is relatively inexpensive and it has a relatively low heat conductivity.

Figure 3:
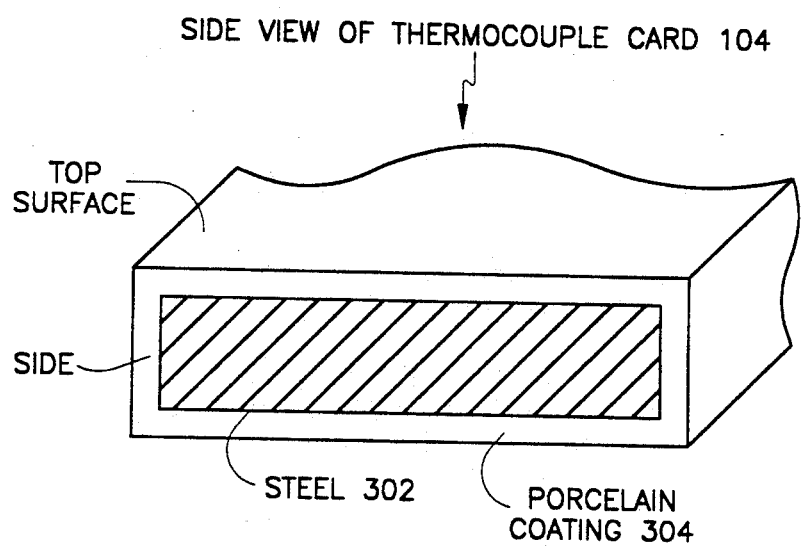
FIG. 3 shows a thermocouple substrate card 104 with a steal core 302 and porcelain coating 304.

FIG. 3 shows a cross-section of the composite PCS material. Porcelain coating 304 can vary in thickness from approximately a minimum of 20 microns to a maximum of 200 microns. Porcelain is a brittle material and therefore it needs to have a ductile (non-brittle) support material such as steel 302 as a core material. Other core metals can be used but they are less common.

Figure 4:
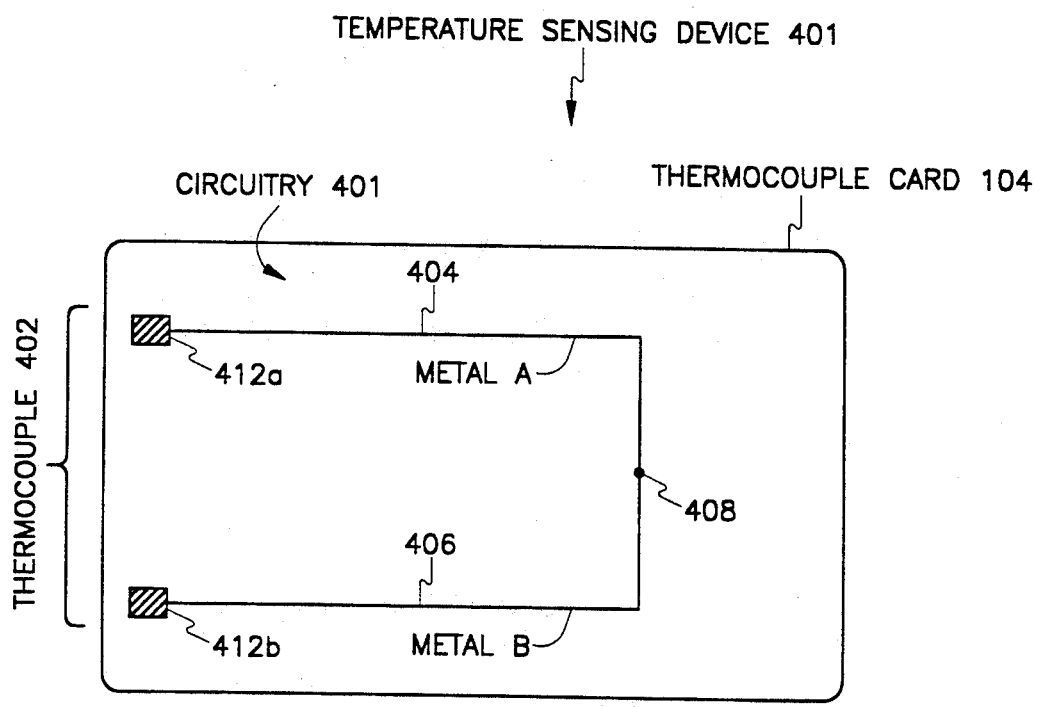
FIG. 4 shows a temperature sensing device 401 having a single thermocouple 402 printed on a substrate card 104.

FIG. 4 shows basic circuitry of a temperature sensing device 401. Temperature sensing device 401 is a single thermocouple 402 printed on substrate card 104. This circuitry is composed of a wire or line 404 of thermocouple metal A and a line 406 of thermocouple metal B.

It is possible to employ conventional metals commonly used in thermocouples for metal A and metal B, such as Chromel and Alumel; or Copper and Constantan. In a preferred embodiment, pure metals are used instead of alloys. This is unusual, since the industry tends to employ alloys. However, at the thin film level it is very difficult to control compositions of alloys. Pure metals, on the other hand, are very easy to control, because there is nothing to mix.

The preferred metals used in the temperature sensing device 401 are: pure Nickel for metal A; and pure Copper for metal B. Of course, metal A could be Copper and Metal B could be Nickel. Both Copper and Nickel were chosen for a number of reasons: 1) they have a higher melting-point temperature than tips tends to reach; 2) Copper and Nickel provide a known linear response when heat is applied; 3) Copper and Nickel are oxidant resistant and scratch resistant; and 4) Copper and Nickel are inexpensive. Other pure metals can be substituted for Copper and Nickel according to the specific application. For example for more precise measurements, Gold and Platinum can be employed. However, these metals have a higher cost associated with them.

As shown in FIG. 4, line 404 is connected to an edge-connector pad 412a. Line 406 is connected to an edge-connector pad 412b. Pads 412a and 412b should preferably be made of the same material as their respective lines. Both lines 404 and 406 are directed in such a way as to intersect and join at a junction point 408 on the plane of the substrate card 104.

Figure 5:
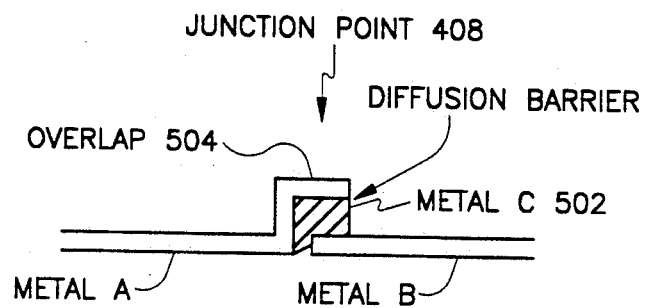
FIG. 5 shows a cross-sectional view of a thermocouple junction point having a diffusion barrier between Metal A and Metal B.

FIG. 5 is a cross-section view of junction point 408, according to a preferred embodiment of the present invention. As shown in FIG. 5, dissimilar metals A and B make contact by an overlap 504 of metals A and B. Metals A and B are interconnected but separated from each other at the junction 408 by a metal layer 502, referred to as metal C, which acts as a diffusion barrier. The role of diffusion barrier layer 502 is to reduce the alloying action that takes place when two pure metals are heated in contact with each other. In the preferred embodiment, metal C is made of platinum or cobalt. Metal C could be composed of other metals and should not be limited to platinum or cobalt.

While the above description refers to the use of a single thermocouple, a plurality of thermocouples contained on the substrate carrier is more desirable since the useful life of the substrate card is directly proportional to the number of thermocouples available on the substrate card. In this regard it is advantageous to have the highest number of thermocouples on a given card. In the preferred embodiment nine thermocouples are used. However, it is assumed that any number of thermocouples may be placed on the card.

The limiting factors associated with the number of thermocouples that can be placed on a card is the number of connector pins (not shown) located in the edge connector 106 and the amount Of area required by a layout. The conventional approach for placing a plurality of thermocouples on a substrate, is to simply repeat the two-line pattern described for a single-thermocouple layout, as shown in FIG. 4. In this case, the number of lines to be printed (as well as the number of edge-connector pads) would be twice the number of thermocouples (e.g., 20 lines and 20 edge-connector pads for 10 thermocouples; 200 lines and 200 edge-connector pads for 100 thermocouples; etc.)

In the present invention a non-conventional layout design for the thermocouple circuitry is provided. The layout requires the same number of lines (and edge-connector pads) as the number of thermocouples plus one. Thus, for 200 thermocouples, only 201 lines (and edge-connector pads) are needed. In other words, the number of wires needed on a thermocouple card of the present invention is determined by the expression: $N+1$, where N is the number of thermocouples. The number $+1$ refers to a common line (to be explained) which is shared by all the thermocouples.

This is a significant advantage of the present invention over conventional temperature sensing devices, since the number of wires needed on a thermocouple card is reduced almost in half as compared to conventional-type temperature sensing device having an expression $2N$, where N is the number of conventional thermocouples. Additionally, the number of pins located in the edge connector 106 is significantly reduced permitting additional thermocouples 122 on the thermocouple card 104.

Figure 6:
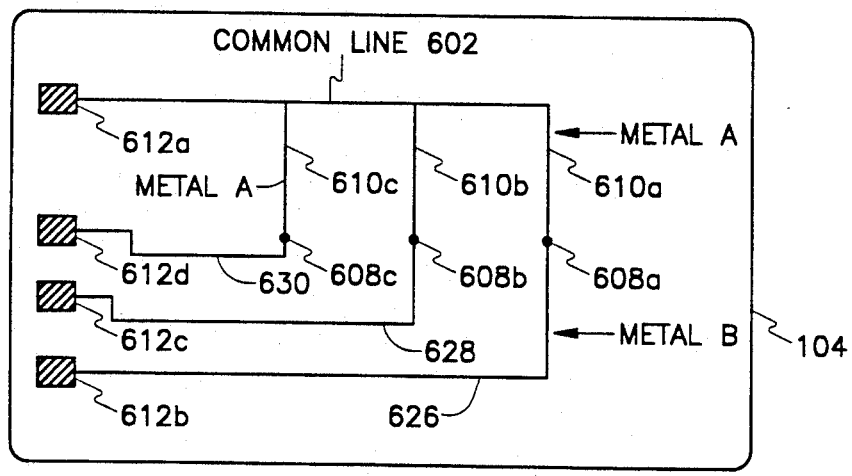
FIG. 6 shows a circuit diagram of a temperature sensing device 601 having a plurality of thermocouples 608.

FIG. 6 is an example of a temperature sensing device 601 having a plurality of thermocouples 608 printed according to the present invention. For the purpose of illustration only three thermocouples 608a-608c are shown in FIG. 6, but it is understood that the layout may include as many thermocouples 608 as the given card size area permits.

A common line 602 is employed for all thermocouples 608a-c. The use of one common line, composed of either Metal A or Metal B on a card 604, allows a higher number of thermocouples printed on the card 604. The common line 602 made of metal A is connected to an edge-connector pad 612a. The common line is also interconnected to thermocouple junction points 608a-608c. Tie lines 610a, 610b, and 610c made of the same material as the common line 602 (metal A), connect common line 602 to thermocouple junctions 608a-608c.

Each junction 608 is connected individually to their respective edge-connector pads 612b, 612c and 612d via lines 626, 628, and 630, composed of metal B.

Figure 7:
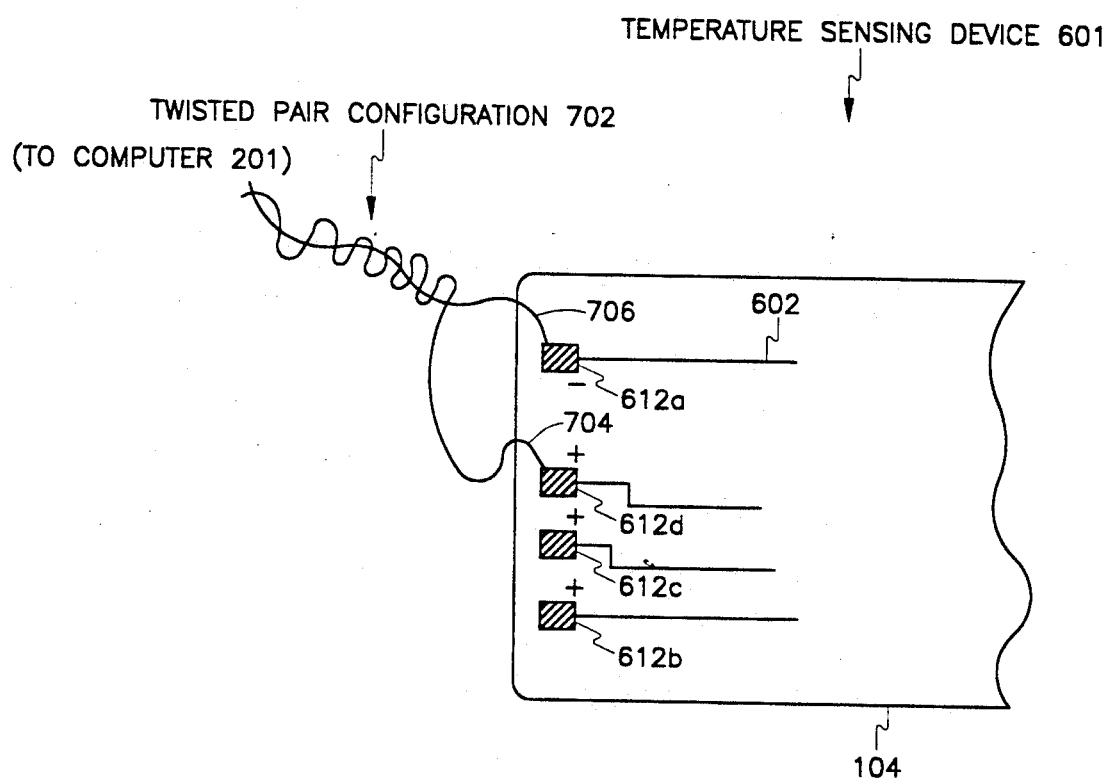
FIG. 7 shows one way to electrically connect wires to a thermocouple card.

FIG. 7 shows a temperature sensing device 601 with pins 704 and 706 of an edge connector (shown in FIG. 1 as 106) connected to pads 612a and 612d. In order to read the electrical potential generated by a given junction 608 during a temperature measurement event it is required to make at least two connections: one to a positive pole and the other to a negative pole. In other words, one connection wire needs to touch pad 612a (Metal A). The other connection wire needs to touch one of the pads 612b-d of metal B. Selection of pads 612b-d depends on which particular thermocouple junction 608 is selected for use.

Connection wires or pins 704 and 706 coupled to edge-connector pads 612 act as noise generators that cause problems in the accuracy of reading electrical signals transmitted from thermocouple junction points 608. Noise is eliminated if wires 704 and 706 are twisted in a pattern referred to as a twisted-pair configuration 702. However, the approach shown in FIG. 7 is unsatisfactory, since only one twisted-pair configuration 702 can be attached to the pads 612 at the same time.

Therefore, it is necessary to have two independent wires for each thermocouple. In order to have access to two wires per thermocouple, multiple wires (not shown) (one for each thermocouple) need to be attached from metal B pads 612b, 612c and 612d to a matching set of wires (not shown) each attached to the common line pad 612a. This ensures that twisting can be accomplished for all wires attached to pads 612a and 612b-d. However, this is a very cumbersome approach and precludes the use of conventional edge connectors 106 as shown in FIG. 1.

Figure 8:
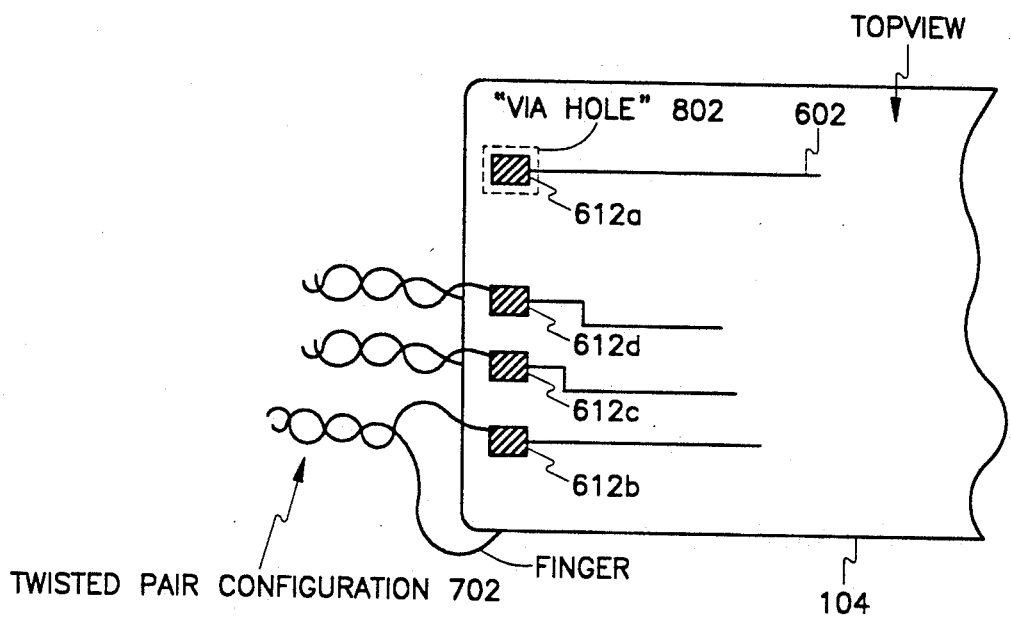
FIG. 8 shows how a thermocouple card can be electrically connected to a female edge connector in accordance of the present invention using top and bottom surfaces of the thermocouple card.

FIG. 8 shows another approach of accessing data signals from thermocouple junction points 608 (of FIG. 8) according to a preferred embodiment of the present invention. As shown in FIG. 8 two wires per thermocouple are connected to each edge-connector pad 612. Each wire pair are shown in twisted wire configuration 702. In this scheme, a via hole 802 is provided to connect to the bottom surface of the card 104 (opposite to the top surface of the card 104 where the thermocouples 608 are contained).

Figure 9A:
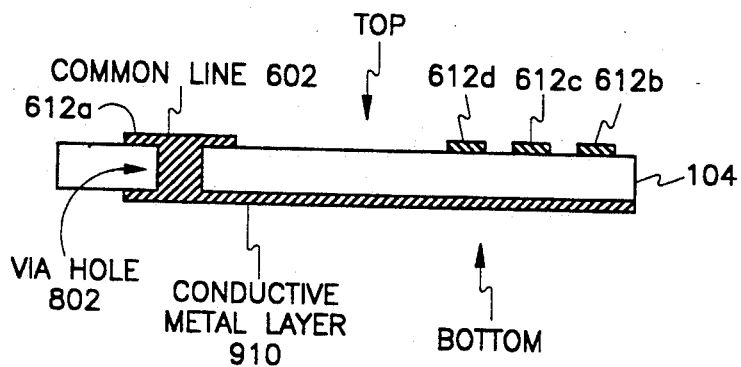
FIG. 9A shows a cross-sectional side view of an end of a thermocouple card 14 that inserts into an edge connector.
Figure 9B:
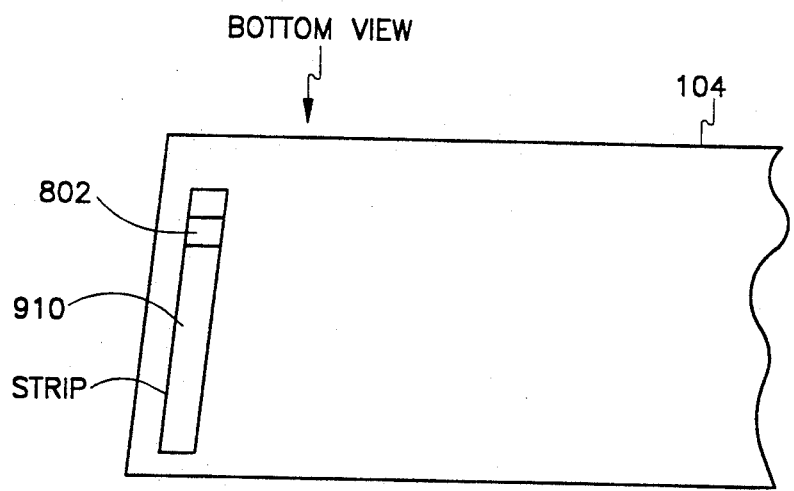
FIG. 9B shows a bottom view of a thermocouple card 104.

This via hole 802 makes an electrical connection from the edge-connector pad 612a of the common line 602 (top surface of the card) to a conductive metal layer 910 on the bottom of the card 104, as shown in FIGS. 9A and 9B. Metal layer 910 extends to the edge of the card in order to make contact with the bottom pins (shown in FIG. 7 as 704, 706) in the edge connector (not shown in this FIGS. 9A or 9B, but in FIG. 1 as 106).

As the thermocouple card 104 is inserted into the edge connector 108 the bottom pins (not shown) will be connected to the common line 602 (thermocouple metal A). The top pins (not shown) will make contact with lines of thermocouple metal B (edge-connector pads 612b-d) connecting to each individual thermocouple junction 608.

Referring back to FIG. 1, cover plate 102 is attached to thermocouple card 104 (by glue or other fastening means). The cover plate 102 protects the thin films (i.e., metal A wires and metal B wires on thermocouple card 104) from external damage e.g., scratches from a sharp object such as the bonding tip 202 or a human finger nail.

Holes 128 in the cover plate 102 are specially lined up with the thermocouple junctions 122 to expose only the thermocouple junction 122. This obviates the need of time consuming alignment procedures to align the tip (not shown) with the thermocouple junction 122, especially in a microscopic environment.

Cover plate 102 enables a person to handle and use thermocouple card 104 in a manufacturing environment without having to take special precautions, which can be time consuming and add substantially to product costs.

The cover plate material should be an insulator to avoid electrical "shorting" between any of the thermocouples. Any of the variety of insulator materials such as ceramics, polymers or composites can be used. In the preferred embodiment, cover plate 102 is made of anodized aluminum. Anodized aluminum is a composite of an aluminum core covered with a thin insulator of aluminum oxide. Anodized aluminum is preferred because it is readily available, inexpensive, structurally strong and scratch resistant.

Operation

Figure 10:
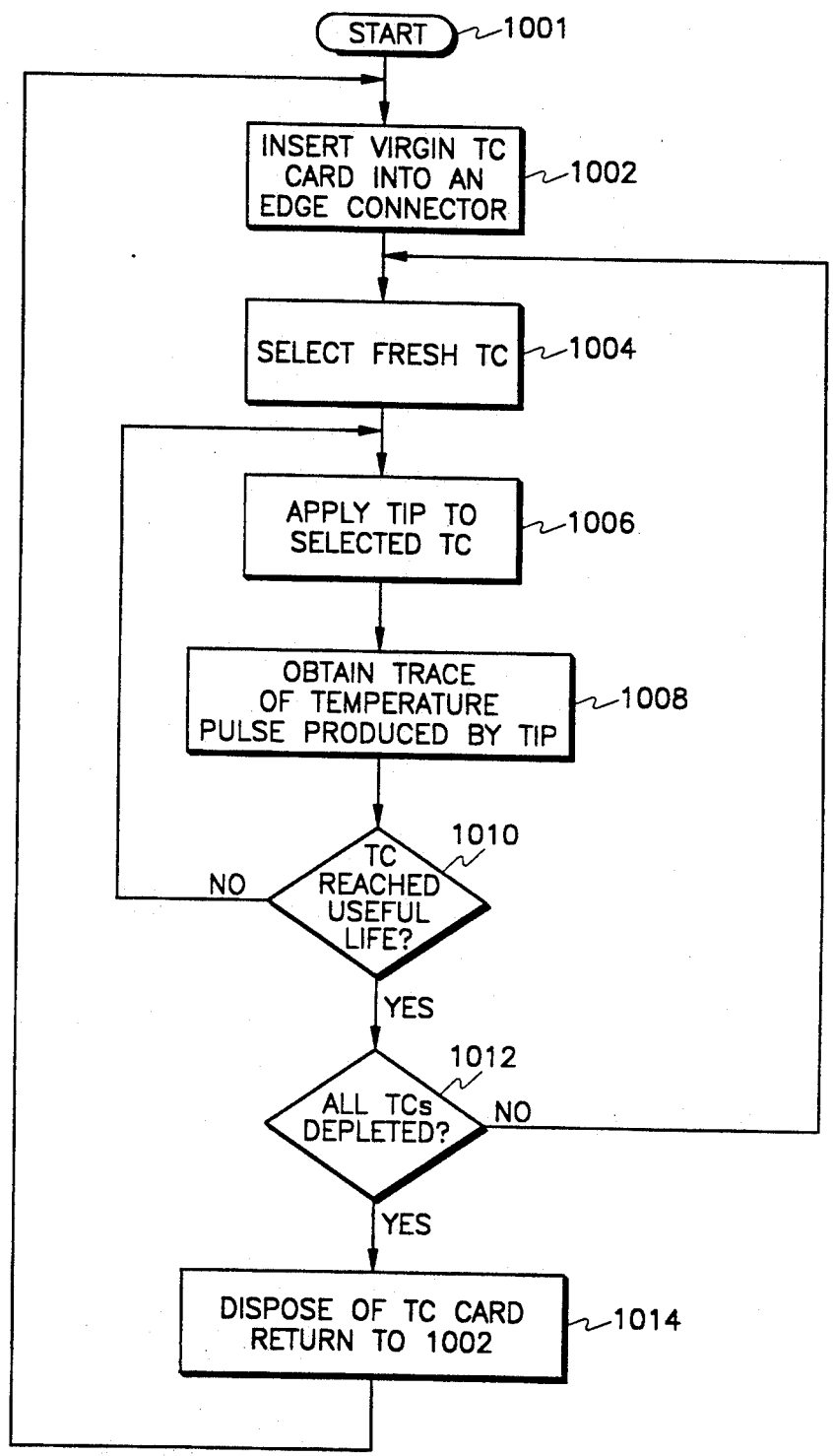
FIG. 10 is a flow chart illustrating the operation of a temperature sensing device in accordance with a preferred embodiment of the present invention.

FIG. 10 is a flow chart illustrating the operation of temperature sensing device 101, 601. FIGS. 1-9 will be referred to when describing the operational steps of FIG. 10.

Referring to FIG. 10, in step 1002 a covered thermocouple card 104 is plugged into the female adapter 103 of edge connector 106. In step 1004, an Operator selects a thermocouple 122 from a plurality of thermocouples 122A-E located on thermocouple card 104.

In step 1006, the bonder operator (not shown) can apply the tip 202 to the thermocouple card 104 by positioning the tip to align with a cover plate hole 128 previously selected. At this point, the bonder tip can be activated.

In step 1008, the bonder tip is activated. The maximum activation time for a tip in most preferred applications is around 300 milliseconds. During this time a signal is produced at the thermocouple junction 122a and sent by the thermocouple 122A through cable 108 to the computer system 201. The computer system 201 converts the signal readings to engineering units (e.g. Centigrade) and displays the resultant temperature trace on a screen 512. Software 510 is programmed to sense the linear response of the thermocouple 122.

Figure 11:
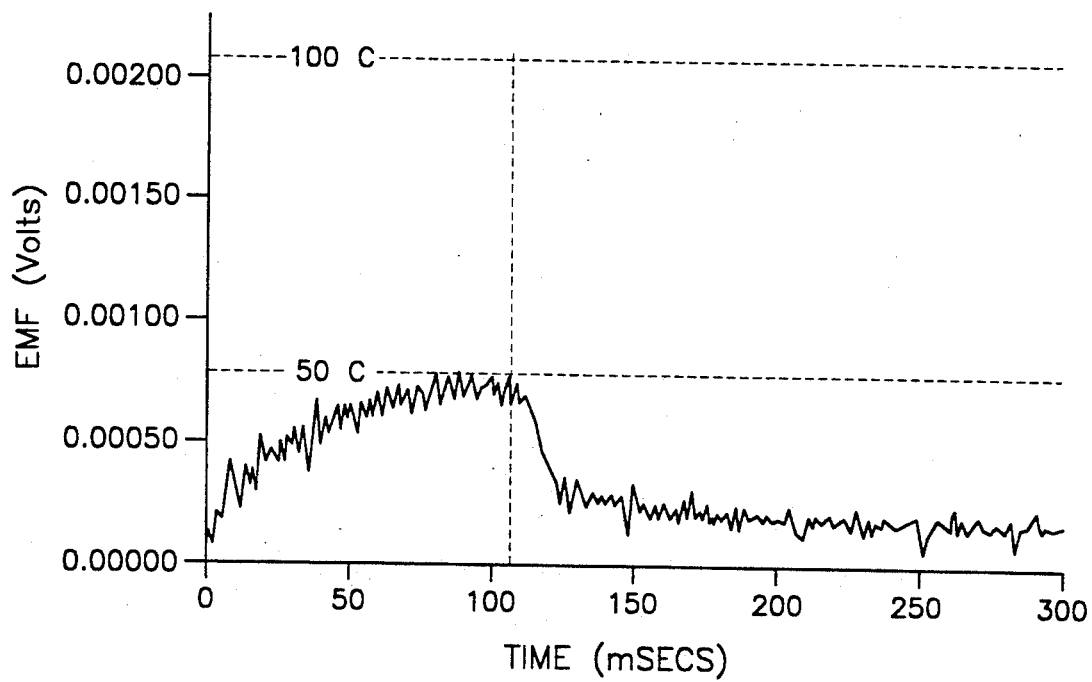
FIG. 11 shows a sample trace of temperature rise with a tip powered with ultrasonic energy only (laser off).
Figure 12:
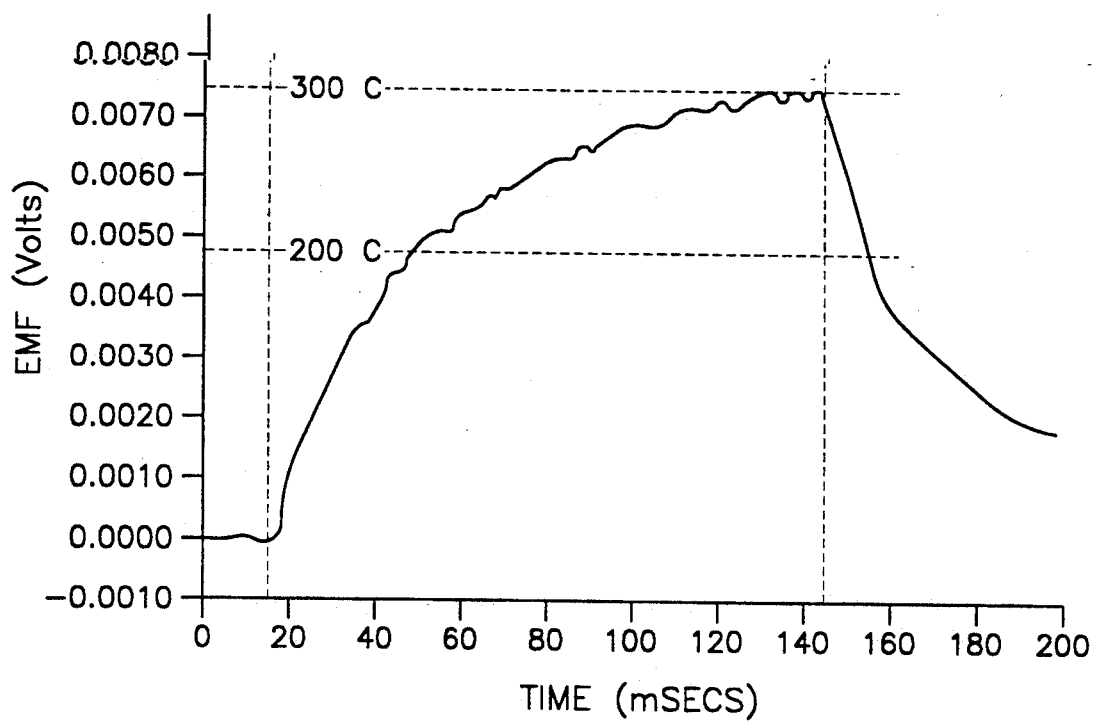
FIG. 12 shows a sample trace of temperature rise with a tip heated with laser energy.

FIGS. 11 and 12 are two examples of heating traces of a tip 202 produced by a thermocouple 122 and computer system 201. FIG. 11 shows a sample trace of temperature rise with a tip powered with ultrasonic energy only (laser off, e.g., no external heating such as from a laser applied to the tip 202).

The graph shows a plot of EMF (volts) versus time. For reference purposes two equivalent temperatures in degrees centigrade are also shown. The trace is a faithful sensing of friction heat generated as the tip 202 vibrated ultrasonically over the flat surface of a thermocouple junction 122, 608. It can be seen that the temperature sensor shows absolutely no delay in response. This is important if the temperature signal is to be used for real-time analysis of the tip's performance.

This graph also demonstrates the ability of the present invention to function even in situations when temperature rise is of the order of a few degrees above room temperature. The usefulness of the present invention to diagnose tip 202 performance for ultrasonic bonding is of paramount importance, since ultrasonic bonding is one of the widest bonding techniques in the industry and the means to diagnostic performance are very limited.

FIG. 12 shows a trace that is analogous to the one shown in FIG. 11 except the temperature reading was taken when the tip was energized primarily with laser heating. It can be seen that the tip 202 developed a relatively high temperature (300 C.) at its peak. This demonstrates the capability of the present invention to be adapted in high-temperature tip conditions. Also shown in FIG. 12 is a delay in the start of temperature rise. this delay matches the delay in the laser shutter (not shown) that opens in order for the laser radiation to flow into the tip 202. Again this further demonstrates that the present invention provides a high level of response and is very sensitive to trace tip heating events in real time.

Once a temperature trace is obtained in step 1008, the operator decides to either continue or discontinue testing. If the decision is to continue, the operator inspects the thermocouple 122, 608 in use and determines visually whether or not the specific thermocouple 122, 608 is still useful. If the thermocouple 122, 608 is considered to be useful then the operator proceeds to repeat the temperature readings as in the previous step. If the thermocouple 122, 608 is considered to have reached the end of its useful life, the operator selects a new thermocouple 122, 608 and repeats the temperature reading procedure. If all the thermocouples 122, 608 have been used then the operator discards the used thermocouple card 104 and inserts a new card 104. The aforementioned will now be described in more detail.

Referring back to FIG. 10, once a temperature trace is obtained, the bonder operator decides whether a thermocouple 122 has reached its useful life as shown in a decisional Step 1010. Experience indicates that a thermocouple 122, 608 will show signs of gradual deterioration by the presence of surface cracks in the junction 122, 608.

These cracks are produced by repeated thermal shocks that the junction 122, 608 experiences during each temperature reading. Typically, these cracks are initiated at high stress points and propagate gradually until total fracture of the thermocouple line occurs. Although, the thermocouple's ability to function properly is not impaired in the early stages of crack initiation and propagation, in the preferred mode of operation the useful life of a thermocouple is defined as the time when a crack is visible to the operator under a 50 times magnification. Using this criteria and depending on the tip temperature used, the life of an individual thermocouple can range from a single reading to several thousands of readings. For typical bonding temperatures thermocouple life is observed to be above 100 readings per thermocouple.

If a thermocouple 122 has not reached its maximum useful life then according to the "NO" path of decisional step 810, the bonder operator repeats steps 806-810 reutilizing the same thermocouple junction 122. If a thermocouple 122 has reached its maximum useful life, then according to the "YES" path of decisional step 810, the operator attempts to employ a new thermocouple junction 122, 608.

According to the "NO" path of decisional step 812, if there is at least one thermocouple junction from a plurality of junctions 122A-E that has not been depleted the operator goes to step 804 and repeats steps 804-812. If all thermocouples 122A-E have been depleted, then following the "YES" path of decisional block 812, the thermocouple card 104 is unplugged from the edge connector 106 and simply discarded, as stated in step 814. The process starts over by inserting a new thermocouple card 104 and utilizing thermocouples 122A-E again.

4.0 Thermocouple Card Device Fabrication

Fabrication of the thermocouple card is basically based on printing one or more of a plurality of thermocouples on the surface of the substrate card 104. The substrate is made available having the desired surface area dimensions and a thickness that is compatible with the type of edge connector selected. For example a nominal card thickness of 1.5 millimeters is commonly used for printed circuit cards in electronics.

Printing of the lines requires one or more thin-film deposition techniques such as evaporation, sputtering, or plating. The width and thickness of the lines are determined by customized requirements. Typically, the line width can have nominal dimensions ranging from approximately 10 to 500 microns, and the thickness can range from approximately 0.1 microns to 20 microns.

The patterning of the lines is done using conventional lithographic techniques where the lines are fabricated by either additive means where the metal is deposited through openings in a mask, or by subtractive means where metal is removed from areas exposed by the mask. For example, if an FR-4 epoxy substrate is selected, the material is purchased with copper layers laminated on both sides (top and bottom) of the card, e.g. the epoxy card is contained between the two copper layers.

A mask containing the circuitry designed for the copper lines and the shape of the thermocouple junction n is placed or deposited on either side of the epoxy substrate and the exposed copper is removed by subtractive means such as etching. When the etching is completed the mask is removed leaving behind the pattern of the copper lines on the substrate 104.

On the other hand if either a ceramic or a porcelain-coated-steel (preferred) substrate is used, normally these substrates are not laminated with a copper layer. In this case the line patterning mask is placed or applied on the bare surface of the substrate. The first of the two dissimilar metals is then deposited through the openings in the mask using conventional methods such as evaporation or sputtering. While these metal deposition methods allows close control of the thickness of the lines, the process is relatively slow and time consuming and therefore is limited to very thin layers of the order of 0.01 to 1 micron. Often, a thin layer of this magnitude is referred as a "seeding" layer because it can be used as a base to build thicker lines.

When the mask is removed the line pattern is very thin. If thicker lines are needed then other fast-rate deposition methods such as plating can be used to deposit additional metal over the base layer of the same metal. No masking is necessary since deposition methods such as electrolytic, electroless, or immersion plating are readily available to deposit metal only on metallic surfaces exposed to the plating bath.

So far we have described the various alternatives to deposit the first of the two dissimilar metals used in the thermocouple. Beyond this point of the fabrication process the procedure is relatively independent of the type of substrate material used.

If a diffusion barrier metal layer (metal C) is to be used at the junction this is done next. A mask containing openings to fully expose only the junction areas is placed or deposited over the substrate. The diffusion barrier metal is then deposited through the openings in the mask using conventional deposition methods such as evaporation, sputtering, or plating, followed by removal of the mask. The choice of material to be used as a diffusion barrier depends on the choice of thermocouple metals A and B. Many materials including pure metals and intermetallic compounds are well known in the trade.

The next step is to print the pattern of lines of the second dissimilar metal on a substrate that already contains the line circuitry for the first dissimilar metal including the base for the junction point. Printing of this second set of lines is done by placing or applying a patterning mask on the surface of the substrate. Proper alignment of the mask insures that the junction sections of the two dissimilar metals coincide precisely at the junction point already determined in the previous printing of the first set of lines. Following the masking step the second dissimilar metal is deposited through the openings in the mask using conventional thin-film methods such as evaporation or sputtering. As mentioned previously these deposition methods yield very thin lines. However, once a thin layer is deposited, thicker lines can be built over the thin layer before the mask is removed (through the mask), by plating methods which are capable of much higher deposition rates. Once the desired thickness is achieved the mask is removed and fabrication of the basic thermocouple circuitry is completed.

The next step is to provide a ground plane on the bottom side of the card. As mentioned earlier this is already provided in the case of commercially available FR-4 epoxy cards laminated on both sides with copper layers. However for ceramic and porcelain-coated-steel (preferred material) the ground plane needs to be added to the bottom side. This is done by either blanket metallization of the entire bottom surface or by selective metallization of a strip or surface near the edge side of the card that is to be inserted in the edge connector.

The final step is the opening of the via hole to connect the edge-connector pad of the common line 602 to the metallized area 910 of the bottom of the card. The hole is opened using conventional methods such as mechanical drilling. Once the hole is opened the metallic surfaces exposed at the top and bottom of the holes are connected by conventional thru-hold plating (commonly used in printed-circuit-board fabrication), or the hole can be filled with a conductive material such as solder or conductive epoxy.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A temperature sensing device for tracing the temperature of a bonding device tip, comprising:
    a thermocouple card;
    a plurality of wires composed of a first metal deposited on said thermocouple card;
    a common wire composed of a second metal also deposited on said thermocouple card; and
    a plurality of connecting wires composed of said second metal connected to said common wire;
    each of said plurality of wires being joined to a corresponding one of said plurality of connecting wires to form a plurality of thermocouple junctions, said plurality of thermocouple junctions forming a plurality of thermocouples that each generate a thermo-electric potential difference across said first metal and said second metal when heat is applied;
    whereby said thermo-electric potential can be used for tracing the temperature rise and fall in the bonding device tip.

2. The device of claim 1, further comprises a cover plate which attaches to said thermocouple card, said cover plate having a plurality of openings that align with said plurality of thermocouple junctions.

3. The device of claim 2, wherein said cover plate is composed of anodized aluminum.

4. The device of claim 1, wherein said thermocouple card is composed of porcelain, said thermocouple card further comprising a steel core portion for providing support for said porcelain.

5. The device of claim 1, wherein said plurality of first metal wires are composed of a different metal than said second metal wire.

6. The device of claim 5, wherein said first metal and said second metals are composed of pure metals.

7. The device of claim 6, wherein said first metal is composed of nickel and said second metal is composed of copper.

8. The device of claim 1, further comprising a plurality of pads which connect to the unconnected ends of said plurality of first wires and the unconnected end of said common wire.

9. The device of claim 8, further comprising an opening bored in said thermocouple card, wherein said common wire connects to the bottom of said thermocouple card via said opening.

10. The device of claim 9, wherein said common wire connects to a conductive strip on the bottom of said thermocouple card.

11. The device of claim 10, further comprising a first finger coupled to one of said pads and a second finger coupled to said conductive strip, said first finger and said second finger provide a means for transferring signals to a computer system.

12. The device of claim 11, wherein said first finger and said second finger are twisted around one another to form a twisted pair.

13. The device of claim 1, further comprising a diffusion barrier composed of a third metal, said diffusion barrier is deposited between said first metal and said second metal at said thermocouple junction.

14. The device of claim 13, wherein said third metal is composed of cobalt.

15. The device of claim 13, wherein said third metal is composed of platinum.

16. The device of claim 1, wherein said wires are between 0.1 microns and 9 microns thick.

17. A methods of tracing temperature rise in a tip of a bonding device utilizing a diagnostic device, said diagnostic device having a disposable thermocouple card with a plurality of thermocouple junctions, the thermocouple card attached to a computer system, whereby signals produced at the thermocouple junctions by said tip can be measured, the tip being applied to the plurality of thermocouple junctions in sequential fashion, said method comprising the steps of:
    (a) applying the tip to a first thermocouple junction on the thermocouple card;
    (b) obtaining a trace on the computer system of the temperature produced by the tip during step (a);
    (c) repeating steps (a) and (b) until a first thermocouple junction on the thermocouple card has reached its functional life span of providing accurate traces of the temperature produced by the tip;
    (d) applying the tip to a second thermocouple junction on said thermocouple card;
    (e) obtaining a trace on the computer system of the temperature produced by the tip during step (b);
    (f) repeating steps (d) and (e) until said second thermocouple junction on the thermocouple card has reached its functional life span of providing accurate traces of the temperature produced by the tip; and
    (g) discarding said disposable thermocouple card after the remaining plurality of thermocouples have reached their respective life span of providing accurate traces of temperature produced by the tip, in a similar fashion as said first and second thermocouples.

18. A temperature sensing apparatus for tracing the temperature of a tip used in microbonding applications, comprising:
    a substrate card;
    a first line, composed of a first metal, printed on said substrate card;
    a second line, composed of a second metal, printed on said substrate card, said second line being superimposed over a portion of said first line to form a thermocouple junction; and
    a third metal deposited between said first metal and said second metal at said thermocouple junction to form a diffusion barrier;
    said first, second and third metals being coupled at said thermocouple junction such that an electrical potential is produced across said first line and said second line when the tip is heated and applied to said thermocouple junction.

19. The temperature sensing device of claim 18, wherein said third metal is composed of platinum.

20. The temperature sensing device of claim 18, wherein said substrate card is comprised of a steel core immersed in a porcelain coating.

21. The temperature sensing device of claim 18, wherein said first and second metals are composed of pure metals.

22. The temperature sensing device of claim 21, wherein said first metal is composed of copper and said second metal is composed of nickel.

23. The temperature sensing device of claim 18, wherein said third metal is composed cobalt.

24. The temperature sensing device of claim 18, wherein said first line and said second line are thin film lines.

25. The temperature sensing device of claim 24, where in said thin patterning is between 0.1 microns and 10 microns thick.

26. The temperature sensing device of claim 18, further comprising a cover plate attached to said substrate card to protect said lines.

27. The temperature sensing device of claim 26, wherein said cover plate has an opening aligned to expose said thermocouple junction to the tip.

* * * * *